(12) United States Patent
Denny et al.

(10) Patent No.: US 6,609,621 B2
(45) Date of Patent: Aug. 26, 2003

(54) NET ANCHORAGE METHODS AND APPARATUS

(75) Inventors: David S. Denny, Middle Haddam, CT (US); George H. Merritt, West Hartford, CT (US); Lance F. Swartwout, Hamden, CT (US); Brian S. Clarke, Ellington, CT (US); Edward T. Mehl, Windsor, CT (US)

(73) Assignee: Sinco, Inc., Middletown, CT (US)

( * ) Notice: Subject to any disclaimer, the term of this patent is extended or adjusted under 35 U.S.C. 154(b) by 0 days.

(21) Appl. No.: 10/072,608

(22) Filed: Feb. 7, 2002

(65) Prior Publication Data

US 2002/0148799 A1 Oct. 17, 2002

Related U.S. Application Data

(60) Provisional application No. 60/267,071, filed on Feb. 7, 2001, and provisional application No. 60/272,278, filed on Feb. 28, 2001.

(51) Int. Cl.[7] .................................................. A47F 5/00
(52) U.S. Cl. ........................ 211/189; 211/183; 211/180
(58) Field of Search ............................... 211/183, 180, 211/186, 187, 191, 190, 189

(56) References Cited

U.S. PATENT DOCUMENTS

| | | | | |
|---|---|---|---|---|
| 4,030,611 A | * | 6/1977 | Konstant | 211/191 X |
| 4,981,225 A | | 1/1991 | Cole | 211/183 |
| 5,078,250 A | * | 1/1992 | Cole | |
| 5,170,829 A | * | 12/1992 | Duncan et al. | 211/191 X |
| 5,573,125 A | * | 11/1996 | Denny | 211/183 |
| 5,791,501 A | * | 8/1998 | Baldwin | 211/183 |
| 5,984,121 A | * | 11/1999 | Cole | 211/183 |

* cited by examiner

Primary Examiner—Robert W. Gibson, Jr.
(74) Attorney, Agent, or Firm—IPLM Group, P.A.

(57) ABSTRACT

A shelf assembly includes vertical posts and horizontal shelf supports that are configured and arranged to define at least one shelf space extending upward beyond upper distal ends of the posts. Net supports are connected to the posts in a manner that supports the net in a position spanning at least one edge of the shelf space.

17 Claims, 9 Drawing Sheets

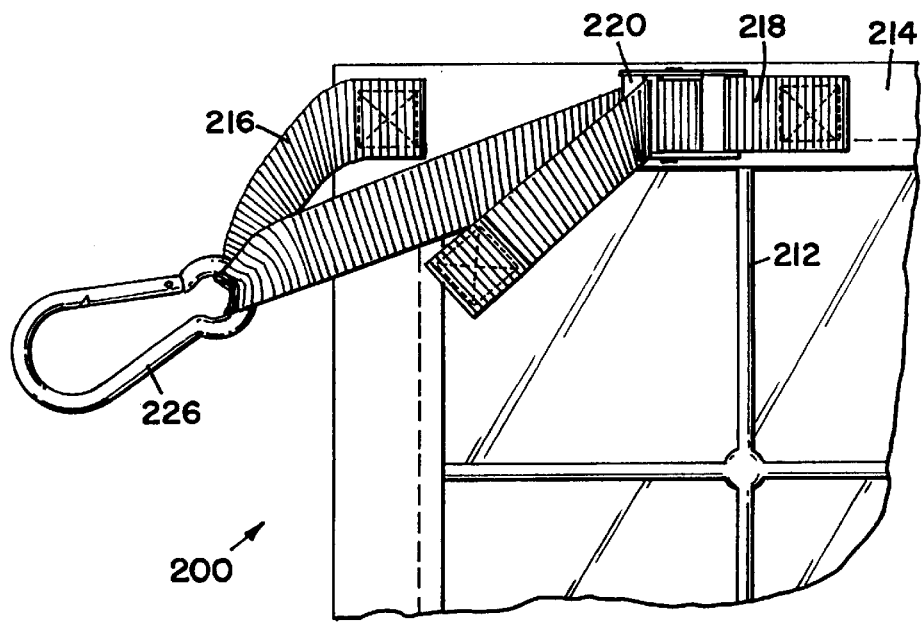
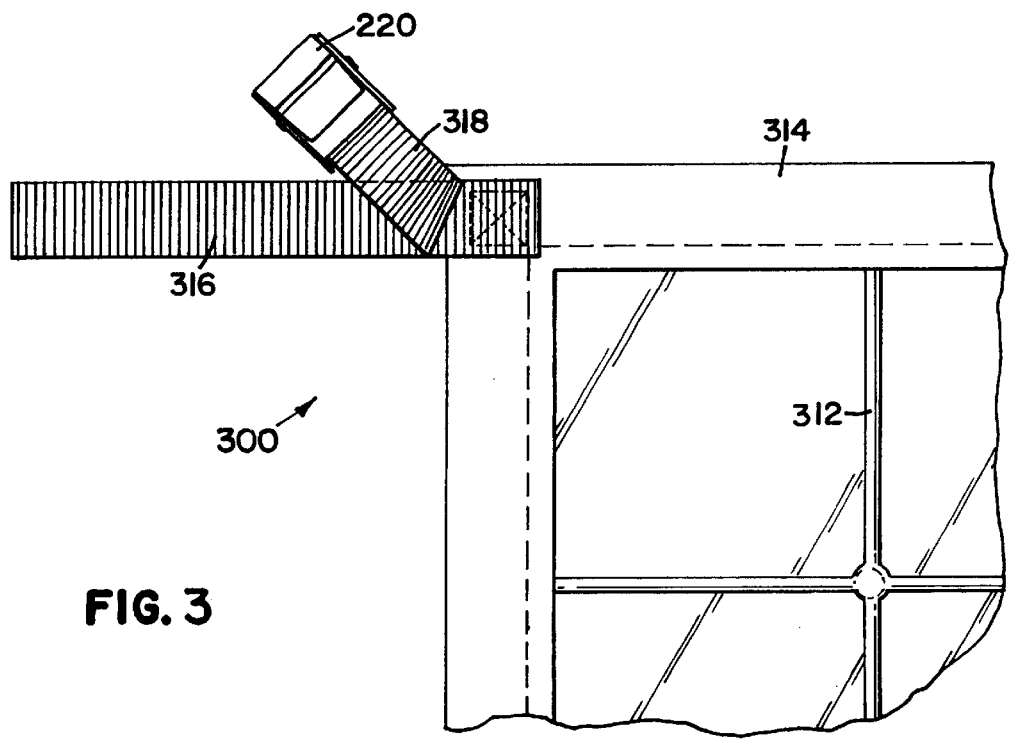

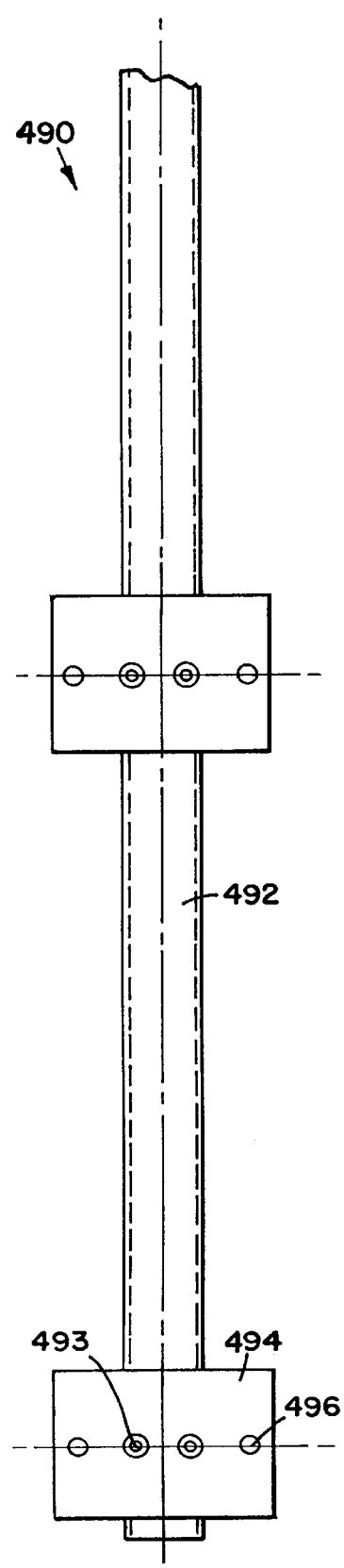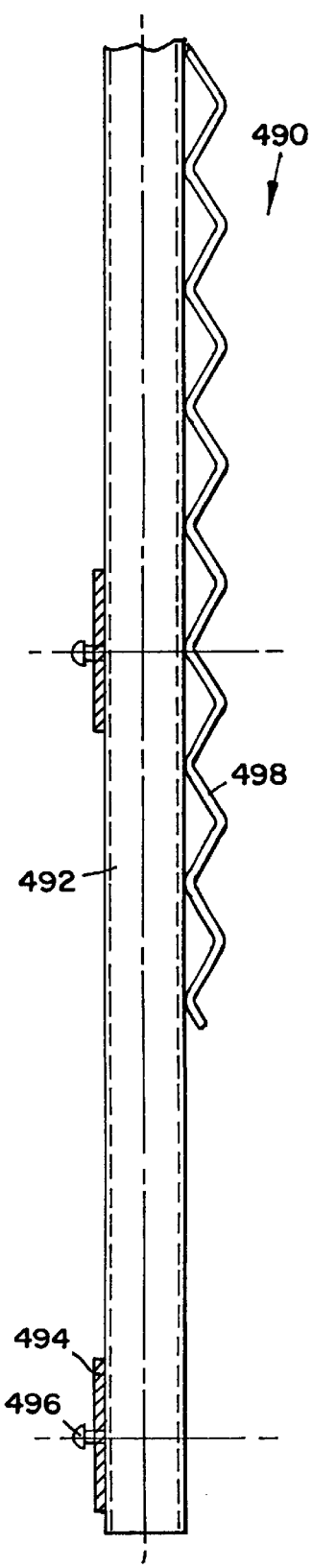
FIG. 5
FIG. 6

NET ANCHORAGE METHODS AND APPARATUS

This application claims the benefit of U.S. provisional application Ser. No. 60/267,071 filed Feb. 7, 2001, and U.S. provisional application Ser. No. 60/272,278 filed Feb. 28, 2001.

FIELD OF THE INVENTION

The present invention relates to methods and apparatus for anchoring a net in a vertical orientation relative to a shelving assembly.

BACKGROUND OF THE INVENTION

Among other things, a net may be used as a barrier across the front of a shelf to prevent items on the shelf from falling. Ideally, such an arrangement should be relatively inexpensive to manufacture, easy to install, and reliable in use. Also, convenient access to the items on the shelf may be desired, in which case, the net should be readily movable into and out of its "barrier" position relative to the shelf. Moreover, it may be desirable to provide such a barrier across a shelf space that extends upward beyond the shelf supporting structure.

SUMMARY OF THE INVENTION

The present invention may be described in terms of a net anchorage system and/or a shelving assembly. In a preferred application, at least one shelf is supported at or near its corners by respective vertical posts, and a net spans at least one edge of the shelf and a storage area above the shelf. Net supports are connected to respective first and second posts, and opposite sides of the net are connected to respective net supports. Many features and/or advantages of the present invention will become more apparent from the detailed description which follows.

BRIEF DESCRIPTION OF THE DRAWINGS

With reference to the Figures of the Drawing, wherein like numerals represent like parts and assemblies throughout the several views.

FIG. 2 is a fragmented front view of a net on the shelving assembly of FIG. 1;

FIG. 3 is a fragmented front view of an alternative embodiment net suitable for use on the shelving assembly of FIG. 1;

FIG. 5 is a rear view of an alternative embodiment net support suitable for use on the shelving assembly of FIG. 1;

FIG. 6 is a side view of the net support of FIG. 5;

DETAILED DESCRIPTION OF THE PREFERRED EMBODIMENT

The present invention may be used in connection with and/or described with reference to shelving. Among other things, the present invention is useful for securing a net along at least one edge of a shelf and across the storage space disposed above the shelf. When properly installed, the net reduces the possibility of objects falling from the shelf and suffering damage and/or inflicting injury.

Figure 1:
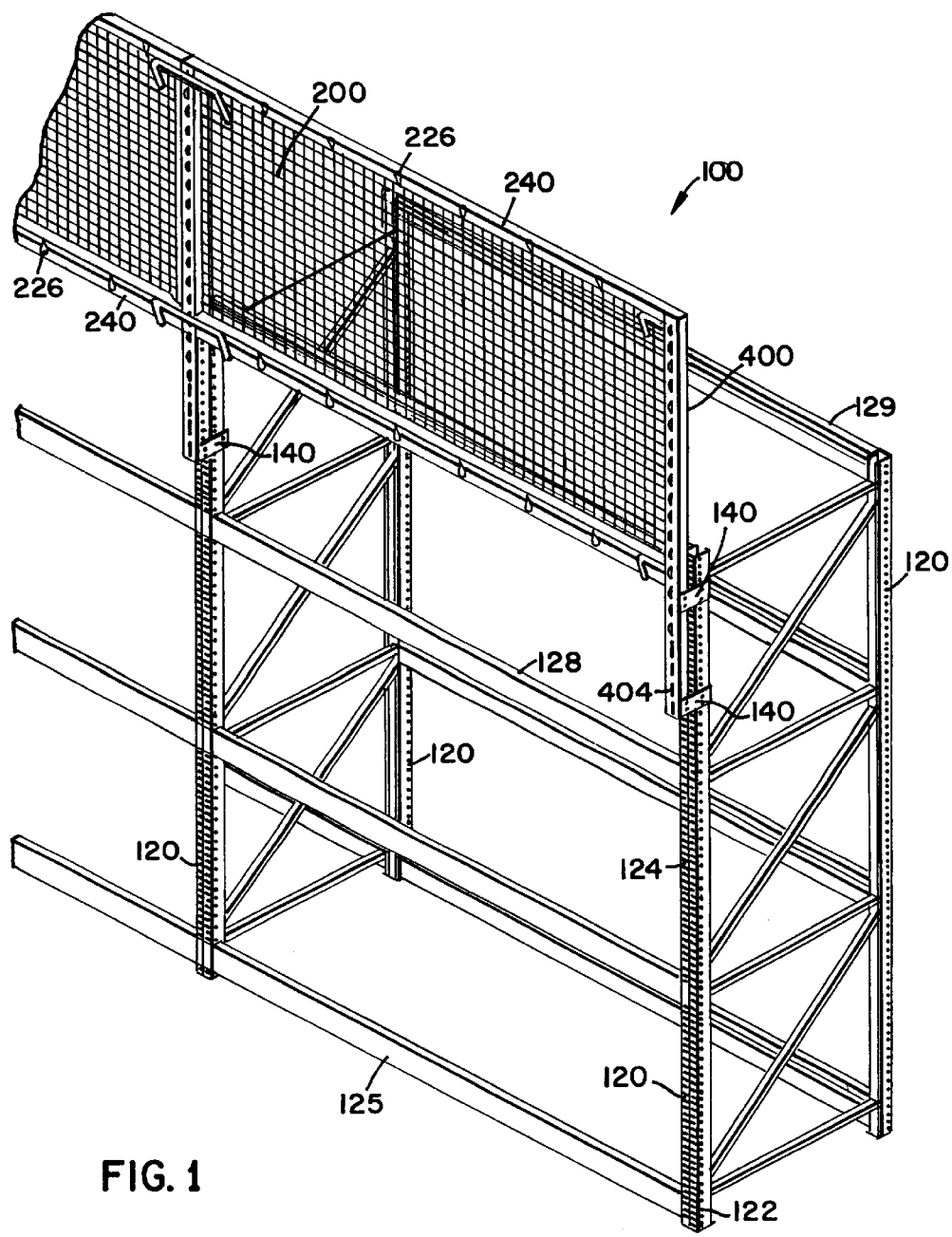
FIG. 1 is a perspective view of a shelving assembly having a top shelf net arrangement constructed and installed according to the principles of the present invention.

FIG. 1 shows a shelf assembly 100 that includes vertical support posts 120 and horizontal supports 125, 128, and 129 which are supported by the posts 120 in a manner known in the art. The supports 125, 128, and 129 may themselves function as shelves for large objects and/or skids, or sheet members may be secured thereto to define shelves having a continuous support surface. In accordance with known practices, keyhole-shaped openings 124 extend through an outwardly facing wall of each post 120. Each opening 124 includes a relatively upward portion that may be described as a circular hole, and a relatively downward portion that may be described as a slot having a width that is smaller than the diameter of the hole. The openings 124 are arranged in two, laterally aligned columns extending lengthwise along the post 120. Also, holes 122 extend through opposite sides of each post 120. Among other things, the holes 122 and/or the openings 124 may be used to interconnect the posts 120 and supports 125, 128, and 129.

In accordance with the present invention, a net 200 extends along the forward edge of the uppermost shelf and spans a storage space disposed above the shelf. Each side of the net 200 is secured to a respective post 120 by means of a respective net support 400. The net 200 prevents objects from falling off the supports 129 or a shelf top associated therewith.

A portion of the preferred embodiment net 200 is shown by itself in FIG. 2. The net 200 includes a mesh panel 212, and a border 214 secured about the perimeter of the mesh panel 212. A first strap 216 has one end secured to the net border 214, and an opposite distal end. A second strap 218 has opposite ends secured to the net border 214, and an intermediate portion secured to a buckle 220. The distal end of the first strap 216 is threaded through the buckle 220 in a manner that allows adjustment of the first strap 216 relative to the buckle 220. A carabiner 226 is secured to an intermediate portion of the first strap and available for connection to an anchor member on a net support 400.

FIG. 3 shows an alternative embodiment net 300 that is also suitable for use with the present invention. The net 300 similarly includes a mesh panel 312, and a border 314 secured about the perimeter of the mesh panel 312. A strap has an intermediate portion secured to the net border 314, a first distal portion 316 that is free, and a second distal portion 318 that is secured to a buckle 220. The free end 316 of the strap may be routed through or about an anchor member and then secured relative to the buckle 220.

Figure 4:
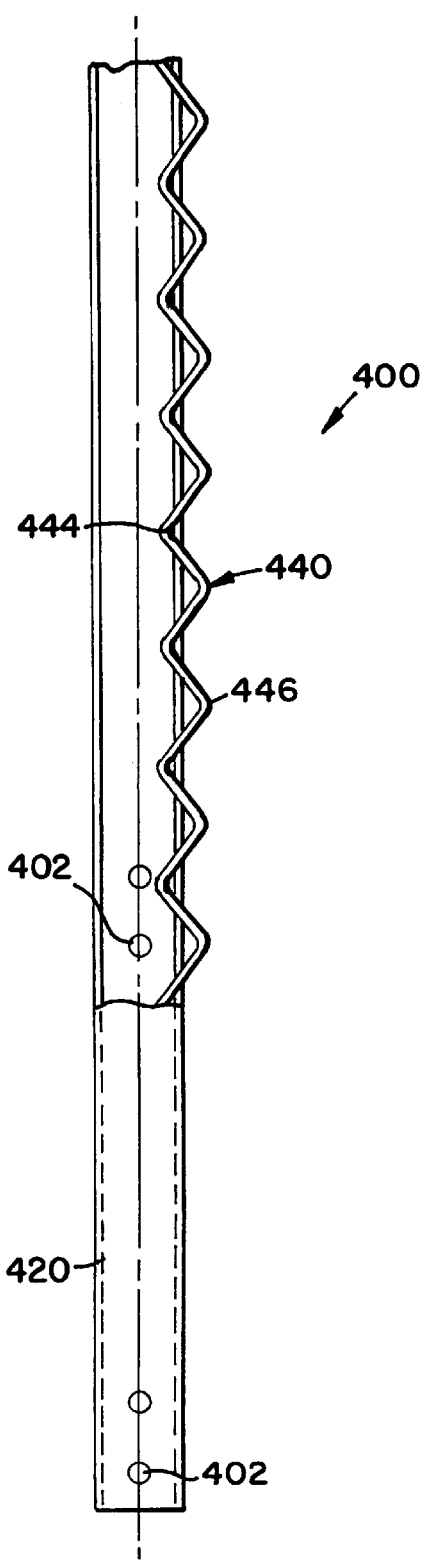
FIG. 4 is a fragmented and partially sectioned side view of a net support on the shelving assembly of FIG. 1.

A portion of the preferred embodiment net support 400 is shown by itself in FIG. 4. The net support 400 includes a tubular post 420 which may be described as having a generally C-shaped profile or cross-section. Holes 402 extend laterally through opposite sides of the post 420, and the holes 402 are preferably spaced at the same intervals as the holes 122 extending laterally through opposite sides of the shelf posts 120. Similarly sized holes are provided in brackets 140 (shown in FIG. 1), and the holes in the brackets 140 are arranged to align with respective holes 402 and 122 in the net post 420 and the shelf post 120 when the components are positioned as shown in FIG. 1. As a result, brackets 140 may be bolted to opposite sides of both a net post 420 and a shelf post 120, thereby rigidly mounting the net post 420 onto the shelf post 120.

With reference back to FIG. 4, an anchor member 440 is disposed inside the net post 420. In FIG. 4, an upper portion of the near side of the net post 420 has been cut away to more fully illustrate an anchor member 440 secured inside. The anchor member 440 may be described as a serpentining wire form having rearwardly extending elbow portions 444, and forwardly extending elbow portions 446. The forwardly extending elbow portions 446 project through respective, longitudinally spaced slots 404 (shown in FIG. 1) in the forward face of the post 420. At least some of the rearwardly extending elbow portions 444 are preferably welded to the net post 420 to rigidly secure the anchor member 440 to the net post 420. As shown in FIG. 1, the carabiners 226 on the net 200 may be secured to respective forwardly extending elbow portions 446 on the net support 400.

FIG. 1 also shows optional cables 240 extending between the net supports 400 proximate the upper and lower ends of the net 200. Additional carabiners 226 may be movably mounted on these cables 240 and secured to respective portions of the net 200 to facilitate opening and closing of the net 200 relative to the shelf (and to maintain the net 200 in a readily deployable state at all times).

FIGS. 5–6 show an alternative embodiment net support 490 designed for use in accordance with the principles of the present invention. The net support 490 includes a bar 492, brackets 494 rigidly secured to a rearward face of the bar 492 (by rivets 493, for example), and a serpentining wire form 498 rigidly secured to an opposite, forward face of the bar 492 (by welding, for example). Mushroom-shaped pegs 496 project outward from each bracket 494. The pegs 496 are configured and arranged to fit into respective openings 124 in a standard post 120. The force of gravity acting upon the bar 492 encourages the pegs 496 to remain seated in respective openings 124. Like the anchor member 440, the wire form 498 provides spaced apart, closed loops that are suitable for anchoring carabiners, straps, or the like.

Figure 7:
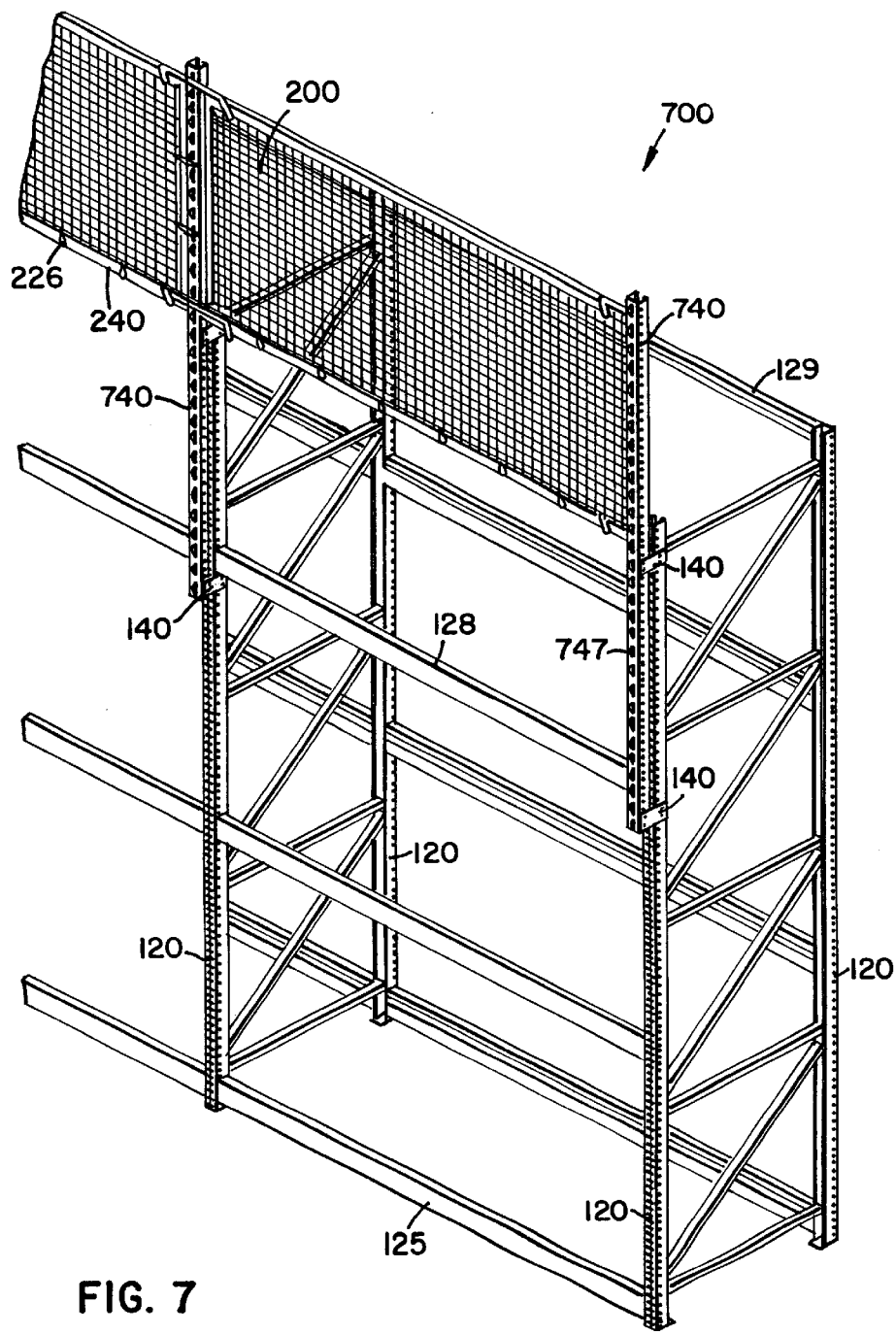
FIG. 7 is a perspective view of another shelving assembly having a shelf net arrangement constructed and installed according to the principles of the present invention.

FIG. 7 shows a second shelf assembly 700 constructed according to the principles of the present invention. The shelf assembly 700 is similar in all but two respects to the shelf assembly 100. First, a top cable 240 is not provided. Second, the net supports 740 and associated anchor members 747 are long enough to span both the shelf space above the top shelf 129 and the shelf space above the next lowest shelf 128. As a result, a second net (not shown) may be secured across the front of the second highest shelf, or a relatively larger net (not shown) may be secured across both the highest shelf and the second highest shelf.

Figure 9:
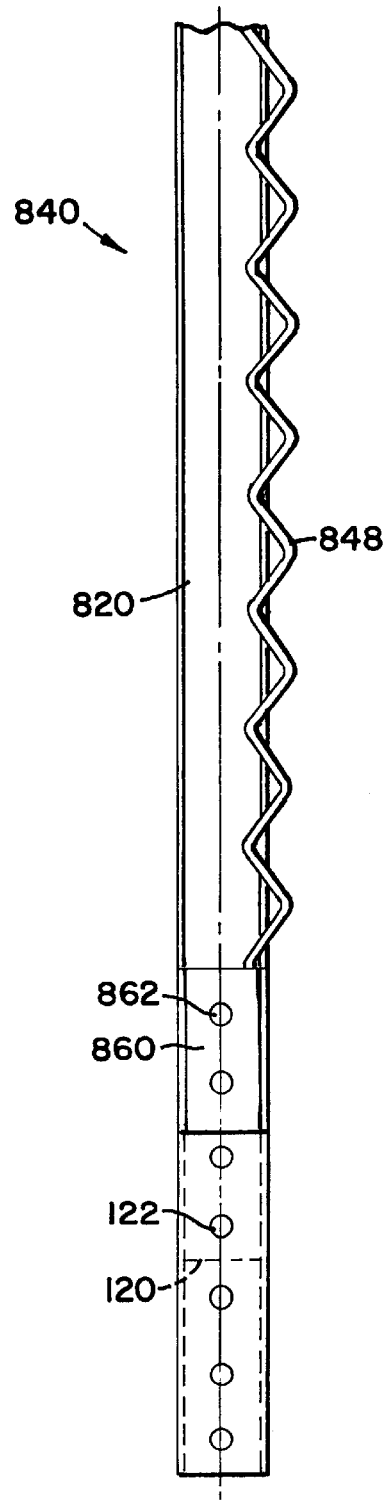
FIG. 9 is a fragmented and partially sectioned side view of a net support on the shelving assembly of FIG. 8.
Figure 8:
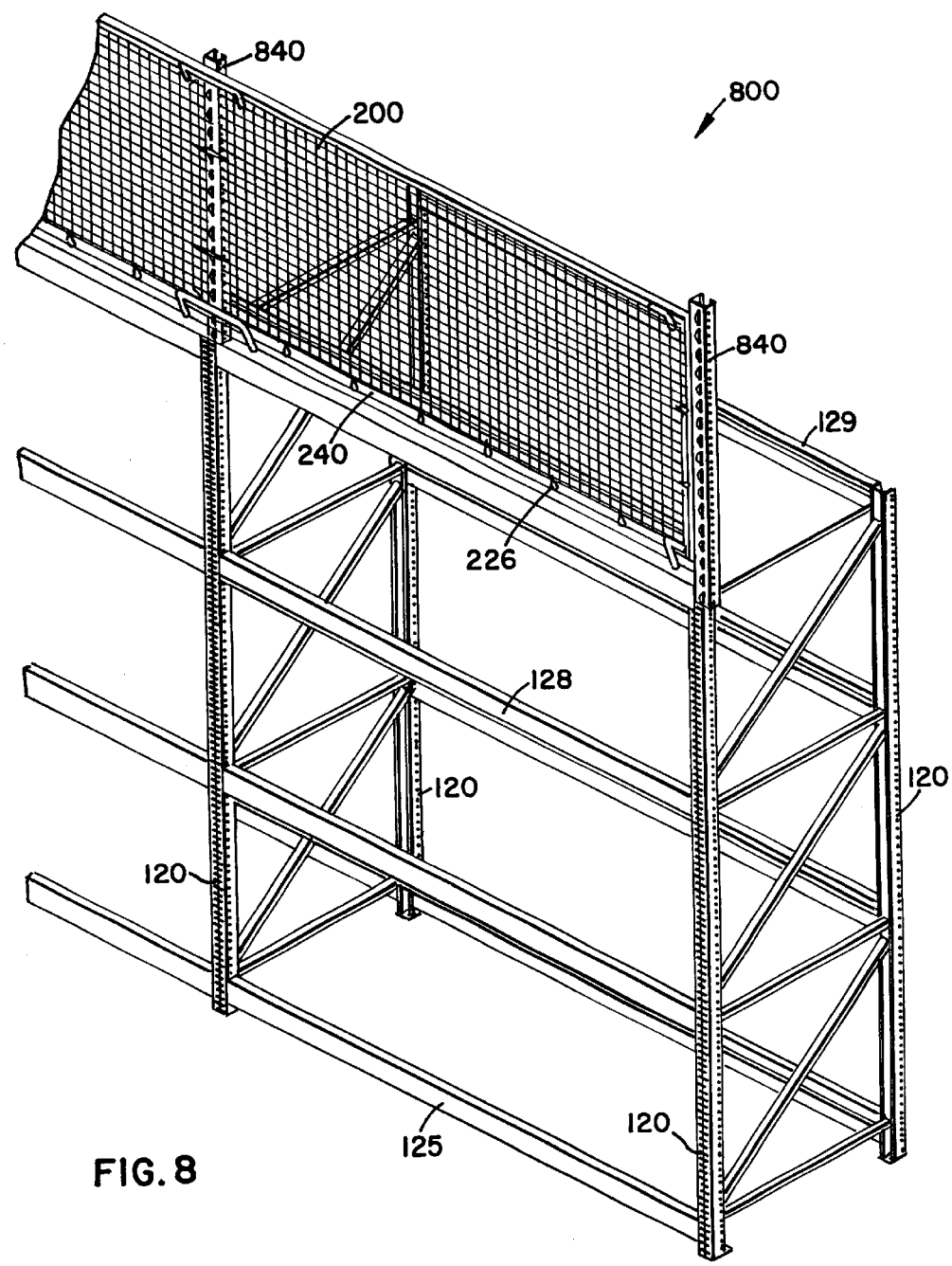
FIG. 8 is a perspective view of yet another shelving assembly having a shelf net arrangement constructed and installed according to the principles of the present invention.

FIG. 8 shows a third shelf assembly 800 constructed according to the principles of the present invention. The shelf assembly 800 is similar in many respects to the second shelf assembly 700. In fact, the only differences involve the net supports 840 and the manner in which they are connected to the shelf posts 120. FIG. 9 shows this aspect of the shelf assembly 800 in relatively greater detail.

Like the net support 400, the net support 840 includes a net post 820 having a cross-section that is generally C-shaped, and it preferably coincides with the cross-section of the shelf post 120. Also, a similar anchor member 848 is secured inside the net post 820. An upper end of a connecting bar 860 is inserted into the lower end of the net post 820, and bolts are inserted through aligned holes in the net post 820 and the bar 860. The holes in the bar 860 are designated as 862. An opposite, lower end of the connecting bar 860 is inserted into the upper end of the shelf post 120, and bolts are inserted through aligned holes in the shelf post 120 and the bar 860. The holes in the shelf post are designated as 122. As a result, the net post 820 is longitudinally aligned with the shelf post 120 and rigidly secured thereto. This arrangement is suitable for supporting a net 200 in front of the top shelf 129.

Figure 10:
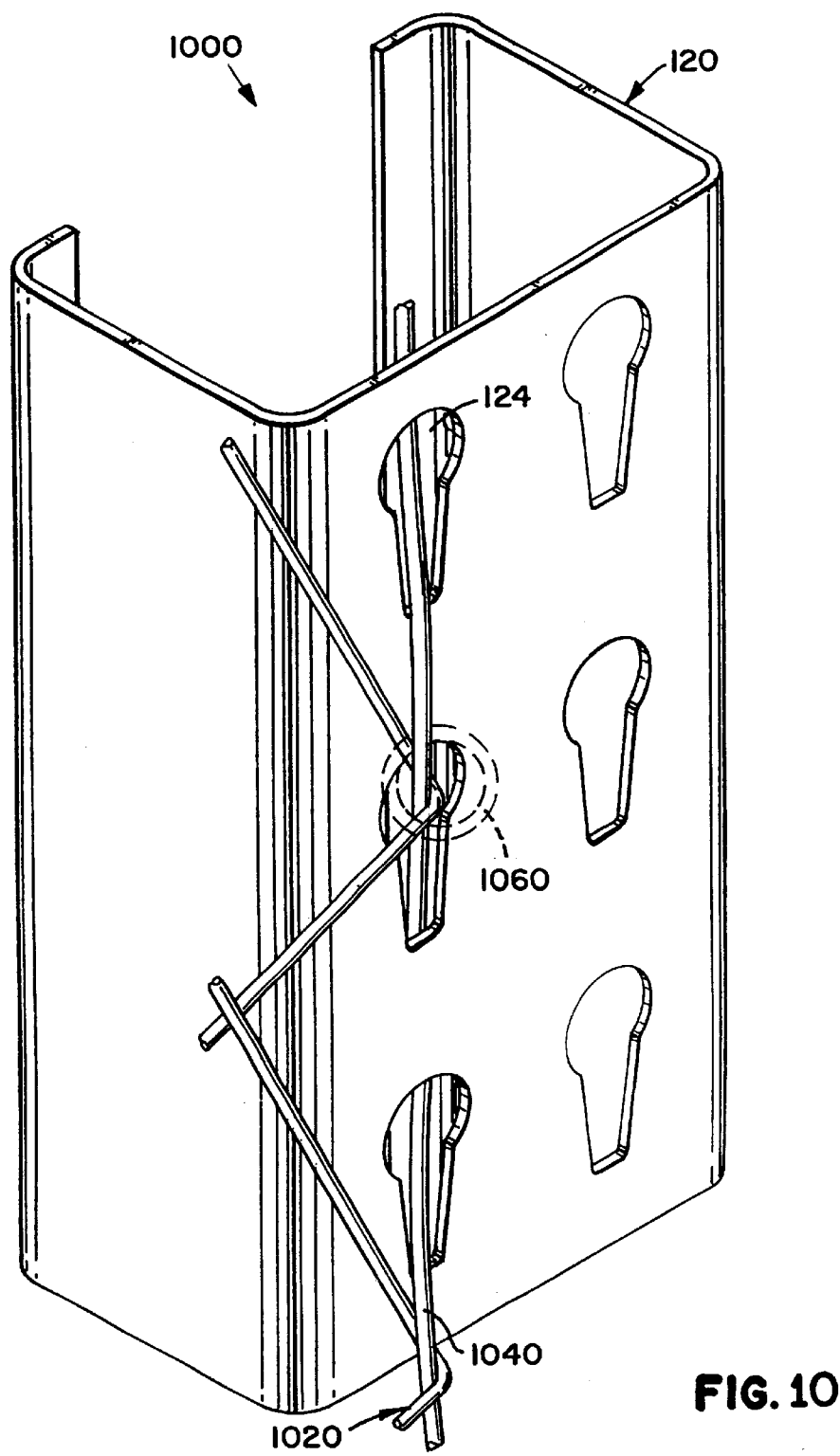
FIG. 10 is a fragmented perspective view of yet another net supporting arrangement constructed according to the principles of the present invention.

FIG. 10 shows yet another net supporting arrangement 1000 suitable for use in accordance with the present invention. In this arrangement 1000, a flexible cord 1040 is woven through openings in a net 1020 and openings 124 in the post 120. Opposite ends of the cord 1040 are secured to the post 120 by bolts, clips, knots, or other suitable means. In one method of use, the arrangement 1000 may be used to secure only one side of the net 1020, and a more "access friendly" or "quick release" arrangement may be used on the opposite side. In another method of use, a separate ring 1060 (shown in dashed lines) may be provided along each accessible segment of the cord 1040, and "quick-release" fasteners (such as carabiners 226, for example) may be interconnected between respective rings 1060 and respective portions of the net.

Figure 11:
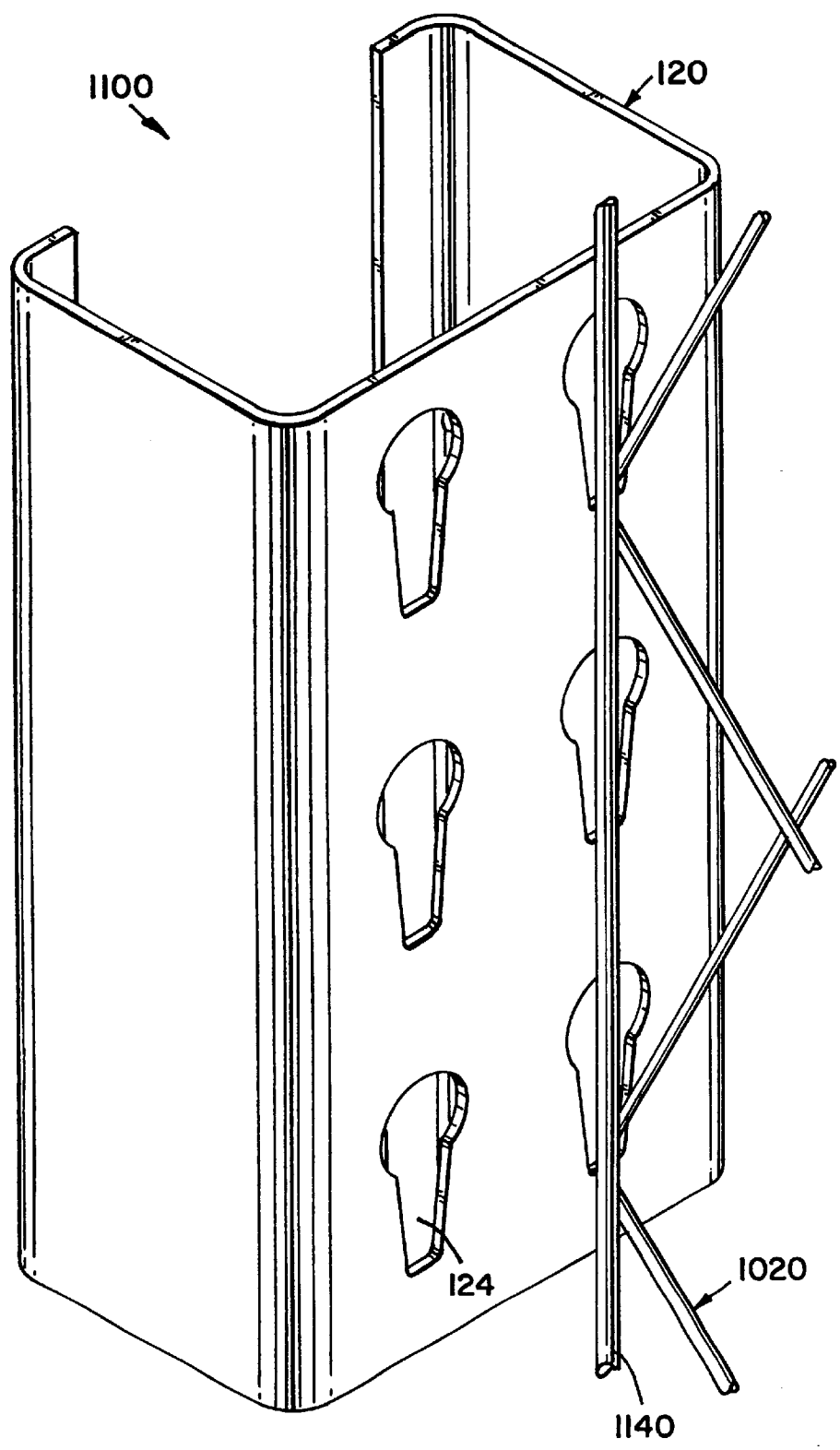
FIG. 11 is a fragmented perspective view of still another net supporting arrangement constructed according to the principles of the present invention.
Figure 12:
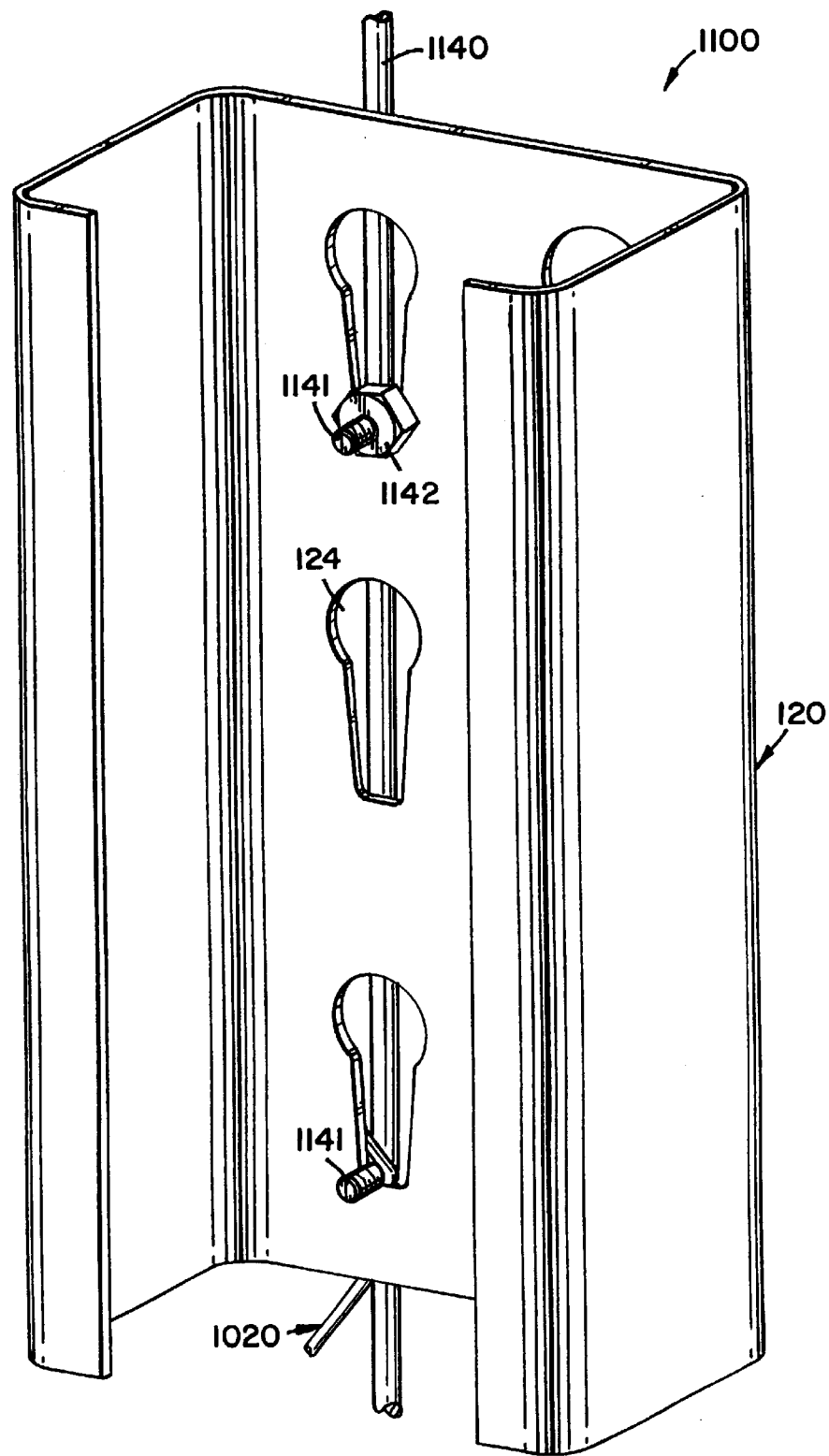
FIG. 12 is a generally opposite, fragmented perspective view of the net supporting arrangement of FIG. 11.

FIGS. 11–12 show still another net supporting arrangement 1100 suitable for use in accordance with the present invention. In this arrangement 1110, a rigid rod 1140 extends along a column of openings 124 in the post 120, and pegs 1141 extend perpendicularly away from the rod 1140, through respective loops in the net 1020, and into respective openings 124. As shown in FIG. 12, fasteners 1142 are preferably secured to at least some of the pegs 1141. The depicted fastener 1142 is a threaded nut, but other types of suitable fasteners may be used in the alternative. The ends of rod 1140 may be secured to the post 120 by additional nuts 1142, welding, snap fit brackets, or other suitable means. As with the previous arrangement 1000, the arrangement 1100 may be used to secure only one side of the net 1020 in place, and a more "access friendly" or "quick release" arrangement may be used on the opposite side.

In addition to setting forth specific embodiments and particular applications, the foregoing disclosure will also lead those skilled in the art to recognize additional embodiments, applications, and/or improvements that nonetheless fall within the scope of the present invention. Those skilled in the art will also recognize that the present invention may also be described in terms of various methods of assembling and/or using the embodiments disclosed herein. In view of the foregoing, the scope of the present invention should be limited only to the extent of the following claims.

What is claimed is:

1. A storage assembly, comprising:
    a plurality of vertical shelf posts and horizontal shelf supports configured and arranged to define at least one shelf space having a shelf length that is measured perpendicular to said shelf posts;
    a net sized to span said shelf length;
    a net post secured to a first one of said shelf posts;
    an anchor member secured to said net post in a manner that defines a plurality of longitudinally spaced, closed loop anchor points along said net post; and a plurality of fasteners interconnected between respective anchor points and a respective side of said net.

2. The storage assembly of claim 1, wherein said anchor member is a rigid wire configured in serpentine fashion.

3. The storage assembly of claim 2, wherein said wire includes rearwardly extending elbow portions that are rigidly connected to said net post, and forwardly extending elbow portions that are available for connection to said fasteners.

4. The storage assembly of claim 2, wherein said fasteners are carabiners.

5. The storage assembly of claim 2, wherein portions of said net post and said one of said shelf posts are arranged side by side, and brackets are rigidly interconnected therebetween.

6. The storage assembly of claim 2, wherein said net post and said one of said shelf posts are arranged end to end, and a bar is rigidly interconnected therebetween.

7. The storage assembly of claim 1, wherein said shelf space, said net post, said anchor member, and said net extend upward beyond upper distal ends of said shelf posts.

8. A storage assembly, comprising:
a plurality of vertical shelf posts and horizontal shelf supports configured and arranged to define at least one shelf space having a shelf length that is measured perpendicular to said shelf posts;
a net sized to span said shelf length, wherein adjustable length straps are connected to at least one side of said net;
an elongate member secured to a respective one of said posts, wherein said elongate member is configured to provide accessible, vertically spaced, closed loop anchor points; and
quick release fasteners interconnected between respective straps and respective anchor points.

9. The storage assembly of claim 8, wherein said posts have upper ends, and said elongate member is configured and arranged to support said net above said upper ends of said posts.

10. The storage assembly of claim 8, wherein said elongate member includes a net post, and a wire secured to said net post in a manner that defines said anchor points therebetween.

11. The storage assembly of claim 10, wherein said elongate member includes horizontally extending pegs that are configured to engage respective keyhole-shaped openings in said respective one of said posts.

12. The storage assembly of claim 11, wherein said wire and said pegs are disposed on opposite sides of said net post.

13. The storage assembly of claim 10, wherein portions of said net post and said respective one of said shelf posts are arranged side by side, and brackets are rigidly interconnected therebetween.

14. The storage assembly of claim 10, wherein said net post and said respective one of said shelf posts are arranged end to end, and a bar is rigidly interconnected therebetween.

15. The storage assembly of claim 10, wherein said wire is rigid and configured in serpentine fashion.

16. A storage assembly, comprising:
a plurality of vertical shelf posts and horizontal shelf supports configured and arranged to define at least one shelf space having a shelf length that is measured perpendicular to said shelf posts;
a first net support and a second net support, wherein each said net support includes a net post and a serpentine wire which cooperate to define longitudinally spaced anchor points, and each said net support is secured to a respective one of said shelf posts in a manner that positions at least some of said anchor points above an upper distal end of said respective one of said shelf posts; and
a net interconnected between at least one of said anchor points on said first net support and at least one of said anchor points on said second net support.

17. The storage assembly of claim 16, further comprising a cable interconnected between an upper distal end of said first net support and an upper distal end of said second net support, wherein an upper portion of said net is movably mounted on said cable.

* * * * *